UNITED STATES PATENT OFFICE.

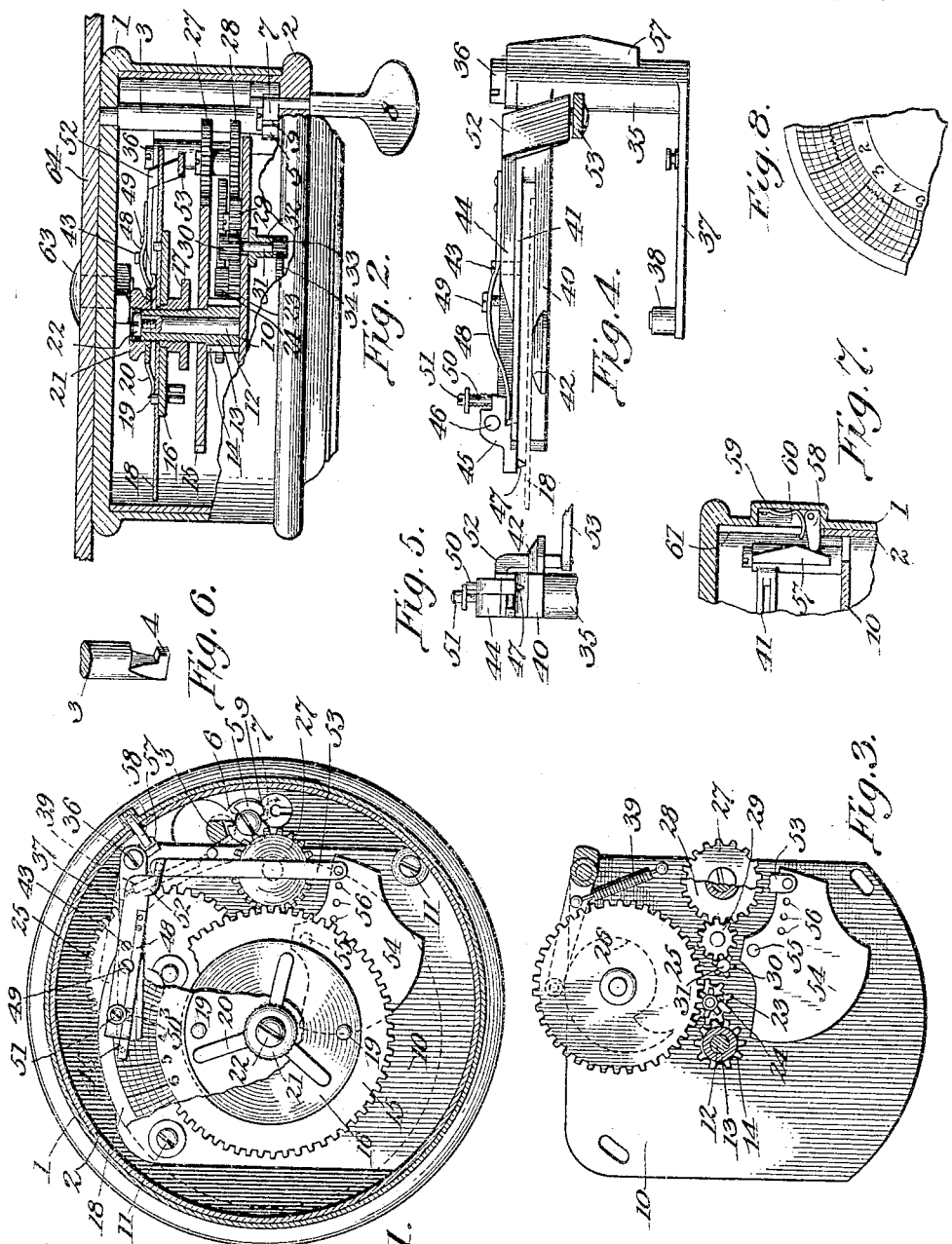

EDWIN SANFORD PHELPS, OF NEW YORK, N. Y.

VIBRATION-RECORDER FOR AUTOMOBILES AND OTHER VEHICLES.

No. 921,157.　　　　Specification of Letters Patent.　　　　Patented May 11, 1909.

Application filed March 1, 1907.　Serial No. 360,084.

*To all whom it may concern:*

Be it known that I, EDWIN S. PHELPS, a citizen of the United States, residing at New York, in the county of New York and State of New York, have invented certain new and useful Improvements in Vibration-Recorders for Automobiles and other Vehicles; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a device for automatically recording the running or moving of automobiles, and other vehicles or moving bodies by actuation of recording means from vibrations of the vehicle or body during the period it is in use.

The object of the invention is to provide a recording member sensitive to the vibrations of the conveyance or vehicle so as to make the record; also to provide for indicating whether the recording device has been tampered with for the purpose of preventing it making its automatic record; also to provide for making a record of access to the operative parts by unauthorized persons.

The device is specially well adapted for affording the owners of automobiles protection against the unauthorized use of the vehicle, since it will furnish a record indicating the use of the same, and the period of its use, as well as a record of access to the operative parts if such be had at any time. It also affords a removable record dial which need not be examined or replaced by another oftener than once a week unless sooner desired, thus giving to the owner the minimum of labor, time, thought and anxiety, and providing for him at the end of the week a correct record of the running of his automobile during the preceding seven days; and in the meanwhile requiring no attention, and not being subject to or making necessary any act on the part of the chauffeur to make a record of the use or running of the machine.

To the accomplishment of the foregoing and such other objects as may hereinafter appear the invention consists in the features hereinafter particularly described and then sought to be clearly defined by the claims, reference being had to the accompanying drawings forming a part hereof, and in which—

Figure 1 is a sectional view through the casing or shell with a portion of the recording dial broken away; Fig. 2 is a plan view with parts in section; Fig. 3 is a detail view of some of the parts; Fig. 4 is a plan view of the vibrating arm carrying the marker and of the snail follower and other parts; Fig. 5 is an end view of the parts shown in Fig. 4, with portions broken away; Fig. 6 is a perspective of the locking post, with part broken away; Fig. 7 is a sectional detail showing means for actuating the marking arm in removing a part of the casing. Fig. 8 is a view of a part of the record-receiving dial showing at one point the marking made by the vibrating marking point.

In the drawing, the numerals 1 and 2 designate the two parts of a shell or casing of any approved pattern, which will contain the working parts of the recorder, one part being locked to the other by suitable means, for instance, by means of a post or pin 3 secured to one part and having a hook or nose 4 at one end with which will engage a button or bolt 5 secured to the other part 2 and formed with a recess 6 adapted, when the two parts of the shell are to be separated, to be brought into alinement with the nose 4 by the bit 7 of a key 8 which will engage a shoulder formed by a notch 9 in the bolt, said recess and nose being moved out of alinement and into locking engagement by the same means when the two parts of the casing are to be locked together. While this affords a simple and effective locking construction, any other desired lock may be employed without affecting other features of the invention.

The recording mechanism contained within the casing in its preferred form is constructed as follows. The numeral 10 denotes a frame secured within one section of the casing, say the part 2, by screws 11 or otherwise, and carries a post 12 on which turns a sleeve 13 formed with a pinion 14 at its base and carrying a toothed wheel 15 making one revolution in 24 hours and consequently denominated the "hour-wheel." The sleeve 13 also carries a dial-plate 16 which may be secured thereto by a threaded nut 17, or otherwise, and upon which is mounted a record-receiving dial 18, preferably of paper sensitive to receiving an impression or mark from a marker but may be of other material, said dial being secured to its plate by pins 19 passing through it and by spring fingers 20 made to bear thereon with more or less friction by means of the swiveled nut 21 having threaded engagement with the sleeve 13, said sleeve being held in place, free to revolve on the post 12, by a screw 22 as shown in Fig. 2. The pinion 14 of the sleeve 13 meshes with a pinion 23 with which is connected a pinion 24 which meshes with a toothed wheel 25 with which is connected a snail 26. The sleeve 13 and hour wheel 15 derive movement from a toothed-wheel 27 connected with a toothed-wheel 28 with which meshes a pinion 29 deriving motion from a pinion 20, the spindle 31 of which passes through a bushing 32 and carries a pinion 33 which derives motion from any suitable form of clock-mechanism which may be carried, say, on the part 2 of the casing and which is not illustrated except a portion 34 of a toothed wheel, representing the ordinary toothed wheel of a clock-spring barrel, such illustration being sufficient as such clock-mechanism does not constitute the invention.

The numeral 35 designates a sleeve rotatable upon a shaft 36 and carriyng at one end a follower-arm 37 having a friction-roller 38 bearing on the involute curved snail 26 and held thereagainst by a spring 39. The sleeve at its other end carries two arms 40 and 41 between which the record-receiving dial 18 will extend the arm 40 having a lip 42 which will serve to guide said record-dial between said arms when from any cause the latter are outside of the periphery of said dial. To the arm 41 there is loosely pivoted by a pin 43 a vibrating arm 44 which carries at its outer end a marking point preferably formed by a finger 45, pivoted by a pin 46 to the arm 44 and carrying a pin 47 to contact with the face of the record-receiving dial 18, said finger being under the influence of a spring 48, the tension of which can be regulated by a screw 49 having its bearing in the arm 44, the free end of said spring to normally depress the end of the finger having the marking pin. The heel of the finger 45 carries an upwardly extending pin 50 against which will bear the head of an adjusting screw 51 by means of which the rear end of the finger may be depressed, so that by means of said screw and the spring the degree of pressure of the marking point on the record-receiving dial may be regulated. The vibrating arm 44 may be restricted in its movement by having a part of the finger 45 fit in an opening or recess 41ª formed in the end of the arm 41, or otherwise.

The rear end of the arm 44 has a lateral or deflected extension 52 to which is pivotally connected one end of a lever 53, the other end of which is pivotally connected to a weight or pendulum 54 fulcrumed at 55, so the movement of said pendulum will be transmitted through said lever to the vibrating arm and thus cause the marking point to make an inscription or mark on the record-receiving dial. The lever 53 can be connected nearer to or farther from the fulcrum of the lever through any one of the openings 56 so as to regulate the sensitiveness of the marking point. The recording-dial is divided into a series of divisions representing the seven days of the week, and these divisions are formed of a series of involute-curved lines, each line representing a space equal to the twenty-four hours of the day, so that one dial can be used for making a record of one week, each line of the involute curve representing one day of the week, and thus the record of each day of the week can be preserved and the week's record filed away for future reference. The involute-curved lines are divided by transverse lines into spaces representing the hours of the day, the space between the hour divisions being divided by transverse lines indicating fractions of an hour—for instance, into six spaces, each space representing a period of ten minutes and the distance traveled by the dial in that period of time—thus permitting to be read from the dial the hour and fraction of the hour at which the marker is operated in the swinging of the pendulum.

It will be observed that the recording-dial is marked with numerals indicating the hours of the day, which numerals may be arranged in two divisions of twelve hours each, although they may run from "1" to "24." The involute curves of the dial and the involute of the snail bear such relation to each other that while the snail is making one complete revolution the recording-dial will make seven revolutions and the snail will travel each day a distance bearing a definite relation to the length of the curve representing the day whose record is to be made, so that the snail will act upon the marking device to carry it from one curved line to the other as one day succeeds another, the snail and gears for transmitting motion thereto being so proportioned as to effect that result.

By connecting the vibrating marker with the pendulum every movement of the pendulum derived from the movement of the body to which the recorder is attached is transmitted to the vibrating marker and the latter leaves its imprint upon the record-receiving dial, and as said dial is continuously moving under the influence of the time mechanism and has divisions representing days of the week and hours and fractions of hours of the day, an inspection of the record-dial will show not only the day but also the time of day and the period of time that the vehicle has been in use.

In order to prevent the mechanism being tampered with to change or destroy the record without having a record made thereof, the sleeve 35 is provided with a suitable cam 57, and the fixed part 1 of the casing is provided with a finger 58 pivoted in an offset 59 of the part 1 so that it can swing in one direction but not the other, and is held in its normal position by a spring 60. This finger projects into the path of the cam 57 the part 2 of the casing being formed with a slot 61 for that purpose. In inserting the part 2 into the part 1 of the casing the cam 57 will press the finger 58 against the influence of the spring 60 so that the sleeve 35 will not be affected, but in withdrawing the part 2 of the casing the finger 58 will not yield to the action of the cam 57 and consequently the pressure of the finger on the cam will turn the sleeve and cause the vibrating marker to swing outward toward the periphery of the record-receiving dial and to make an inscription across the face of the dial to its periphery, thus indicating that the parts have been removed and also indicating the time of the removal and the day. In this way the owner is enabled to determine whether an attempt has been made to tamper with the record.

The recorder will be attached to the body whose movements it is to record. In the drawing it is illustrated as attached by a suitable number of bolts, of which one 63 is illustrated, to a dashboard 64 which may be of an automobile. The nut of the bolt it will be observed is inside the casing so that the recorder cannot be detached except without first withdrawing the recording mechanism, in doing which as above indicated a record thereof will be made.

The device is compact, composed of comparatively few parts, not apt to get out of working condition, and will provide an accurate record of the use or movement of the body to which attached.

I have described with particularity the preferred details of construction and arrangement of parts but the invention is not restricted thereto as changes can be made so as to be within the scope of the appended claims.

Having described my invention and set for its merits what I claim is:—

1. In a vibration recorder, means to support a continuously moving record-receiving member, a marker having a progressive and a reciprocating movement parallel with the face of the record-receiving member, and a pendulum supported independently of the marker and actuated by vibrations of the body to which the recorder is attached operating to reciprocate said marker, substantially as described.

2. In a vibration recorder, means to support a continuously moving record-receiving member, a marker having a radial progressive and a radial reciprocating movement, and a pendulum supported independently of the marker and actuated by vibrations of the body to which the recorder is attached for exerting a radial pressure on the marker, substantially as described.

3. In a vibration recorder, means to support a record-receiving member, a marker having a radial progressive and a radial reciprocating movement, and a pendulous member having a movable connection with the marker and actuated by vibration of the body to which the recorder is attached for exerting a radial pressure on the marker, substantially as described.

4. In a vibration recorder, means to support a record-receiving member, a member having a radial progressive movement across the record-receiving member, a pivotal member carried by said radial progressive member and provided with a marking point, and means pivotally connected with said pivotal member and actuated by vibrations of the body to which the recorder is attached operating to reciprocate said pivotal member, substantially as described.

5. In a vibration recorder, means to support a record-receiving member, a member having a radial progressive movement across the record-receiving member, a pivotal member carried by said radial progressive member and provided with a marking point, and a pendulous member having a movement independently of the pivotal member and operating to reciprocate said pivotal member, substantially as described.

6. In a vibration recorder, means to support a record-receiving member, a marker capable of vibration parallel with the face of said member and movable progressively across the face thereof, and means actuated by vibrations of the body of which the recorder is attached exerting pressure on said marker in a direction substantially parallel with the record-receiving member, substantially as described.

7. In a vibration recorder, means to support a record receiving member, a marker capable of vibration parallel with the face of said member and movable progressively across the face thereof, means actuated by vibrations of the body to which the recorder is attached exerting pressure on said marker in a direction substantially parallel with the record-receiving member, and a spring adapted to press the marking point against the record receiving member.

8. In a vibration recorder, means to support a record receiving member, a marker capable of vibration parallel with the face of said member and movable progressively across the face thereof, means actuated by vibrations of the body to which the recorder is attached exerting pressure on said marker in a direction substantially parallel with the record-receiving member, and means for regulating the extent of vibration of the marker.

9. A travel recorder for vehicles, comprising in combination a clock mechanism, a record sheet moved thereby, a stylus bearing normally on said sheet and a support for said stylus, movable transversely to the normal line of travel of the record sheet and adapted to be oscillated by the vibrations of the vehicle incident to ordinary running whereby a zig-zag or wavy line will be produced on the record sheet while the vehicle is in motion.

10. A travel recorder for vehicles, comprising in combination a clock mechanism, a record sheet moved thereby, a stylus bearing normally on said sheet, and a pivoted support for the stylus having a pendulum attachment, arranged to vibrate in a plane parallel to the record sheet, whereby the stylus will be oscillated transversely to the normal line of travel of the record sheet by the vibrations of the vehicle incident to ordinary running.

11. A travel recorder for vehicles, comprising in combination, a clock mechanism, a circular record sheet rotated thereby, a stylus bearing normally on said sheet, a pendulous support for the stylus, arranged to vibrate in a plane parallel to the record sheet, and a carrier adjustable radially with respect to the record sheet and to which the support for the stylus is connected, these parts being arranged so that the stylus will be oscillated transversely to the normal line of travel of the record sheet by the vibrations of the vehicle incident to ordinary running.

12. In a vibration recorder, means to support a record-receiving member, a marker capable of vibration parallel with the face of the record-receiving member, means for progressively moving the marker in a direction radially of the record-receiving member, means for moving the record-receiving member, and means actuated by vibrations of the body to which the recorder is attached exerting a pressure on the marker in a direction substantially parallel with the face of the record-receiving member, substantially as described.

13. In a vibration recorder, means to support a record-receiving member, a marker capable of vibration parallel with the face of said member, means for progressively moving the marker in a direction radially of the record-receiving member, means for moving the record-receiving member, and a pendulous member exerting a pressure on the marker in a direction parallel with the face of the record-receiving member, substantially as described.

14. In a vibration recorder, means to support a record-receiving member, means for moving said member, a vibrating marker, a pendulum connected with said marker to exert pressure thereon in a plane substantially parallel with the face of the record-receiving member, and means for progressively changing the position of said marker in relation to the record-receiving member, substantially as described.

15. In a vibration recorder, means to support a record-receiving member, means for moving said member, a swinging arm, means for progressively changing the position of said arm in relation to the record-receiving member, a vibrating-marker carried by said arm and capable of vibrating parallel with the face of the record-receiving member, and a pendulum connected with said marker, substantially as described.

16. In a vibration recorder, means to support a record-receiving member, means for moving said member, a vibrating marker capable of vibrating parallel with the face of the record-receiving member, said marker including a member pivotally connected thereto and carrying a marking-point, and means for progressively changing the position of said marker in relation to the record-receiving member, substantially as described.

17. In a vibration recorder, means to support a record-receiving member, means for moving said member, a vibrating marker including a member pivotally connected thereto and carrying a marking point, a spring exerting pressure on said pivoted member to press the marking point against the record-receiving member, and means for progressively changing said vibrating marker in relation to the record-receiving member, substantially as described.

18. In a vibration recorder, means to support a record-receiving member, means for moving said member, a vibrating marker capable of vibrating parallel with the face of the record-receiving member and including a member pivotally connected thereto and carrying a marking point, and means for exerting a regulated pressure on said pivoted member, substantially as described.

19. In a vibration recorder, means to support a record-receiving member, means for moving said member, a vibrating marker, a pendulum, a lever connecting said pendulum, said marker and pendulum having independent centers of oscillation, with the vibrating marker to move the marker parallel with the face of the record-receiving member, and means for regulating the throw of the lever connecting the pendulum and vibrating marker, substantially as described.

20. In a recorder, a record-receiving member, a vibratable marker for recording thereon, a pendulum, the vibratable marker and the pendulum having independent centers of oscillation, and means connecting the pendulum with the marker for transmitting movement of the former to the latter, substantially as described.

21. In a recorder, a record-receiving member, a vibratable marker for recording thereon, a weight, and a yielding connection between the weight and vibratable marker through which motion is transmitted from the former to the latter, substantially as described.

22. In a vibration recorder, means to support a record-receiving member, means for moving said member, a vibrating marker, a pendulum connected with said marker for moving it parallel with the face of the record-receiving member, means for progressively changing the position of said marker in relation to the record-receiving member, and a two-part casing inclosing said parts, one part of the casing carrying the several parts of the recording mechanism, substantially as described.

23. In a vibration recorder, means to support a record-receiving member, means for moving said member, a vibrating marker, a pendulum connected with said marker, means for progressively changing the position of said marker in relation to the record-receiving member, and a two-part casing inclosing said parts, one part of the casing carrying the several parts of the recording mechanism and having the record-receiving means adjacent to the rear of the other part of the casing, substantially as described.

24. In a vibration recorder, a two-part casing, a post connected to one part of the casing and extending within the same toward the other part thereof and having its end formed with a hook, and a bolt connected to the other part of the casing and positioned to have locking engagement with the hook end of said post, substantially as described.

25. In a vibration recorder, means to support a record-receiving member, means for moving said member, a vibrating marker, means for progressively changing the position of said marker in relation to the record-receiving member, a casing inclosing said parts, and means for moving the vibrating marker across the record-receiving member to mark thereon in the operation of withdrawing the operating mechanism from the casing, substantially as described.

26. In a vibration recorder, means to support a record-receiving member, means for moving said member, a sleeve provided with a swinging arm, a vibrating marker carried by said arm, a cam on the sleeve of the swinging arm, a two-part casing inclosing said mechanism, and a finger connected to one part of the casing and located to act upon said cam to swing the arm and its vibrating marker in separating one part of the casing from the other, substantially as described.

In testimony whereof I affix my signature in presence of two witnesses.

EDWIN SANFORD PHELPS

Witnesses:
JULIA I. CORCORAN,
CLARA A. RYLEY.